(12) United States Patent
Valin et al.

(10) Patent No.: US 6,250,657 B1
(45) Date of Patent: Jun. 26, 2001

(54) METHOD FOR MUTUALLY CONNECTING TWO TUBULAR PARTS

(75) Inventors: Daniel Valin, Saint-Amand-sur-Fion; Philippe Deletombe, Chalons sur Marne, both of (FR)

(73) Assignee: Vallourec Composants Automobiles, Vitry-le-Francois (FR)

( * ) Notice: Subject to any disclaimer, the term of this patent is extended or adjusted under 35 U.S.C. 154(b) by 0 days.

(21) Appl. No.: 09/424,532

(22) PCT Filed: Jun. 11, 1998

(86) PCT No.: PCT/FR98/01206

§ 371 Date: Nov. 24, 1999

§ 102(e) Date: Nov. 24, 1999

(87) PCT Pub. No.: WO98/57764

PCT Pub. Date: Dec. 23, 1998

(30) Foreign Application Priority Data

Jun. 18, 1997 (FR) .................................................. 97/07564

(51) Int. Cl.⁷ .................................................. B21D 53/88
(52) U.S. Cl. .................. 280/124.1; 29/897.2; 228/173.4
(58) Field of Search ........................ 280/124.1, 124.125, 280/124.134; 29/897.2; 228/173.4, 173.2, 173.1

(56) References Cited

U.S. PATENT DOCUMENTS

| 3,103,742 | | 9/1963 | Cruson | 228/173.2 |
| 5,884,722 | * | 3/1999 | Durand et al. | 29/897.2 |
| 6,062,762 | * | 5/2000 | Lustig | 228/173.4 |

FOREIGN PATENT DOCUMENTS

| 33 15 912 | 4/1985 | (DE) . |
| 0 462 394 | 12/1991 | (EP) . |
| 2 291 382 | 1/1996 | (GB) . |

* cited by examiner

*Primary Examiner*—Peter C. English
(74) *Attorney, Agent, or Firm*—Young & Thompson

(57) ABSTRACT

The invention concerns the production of a mechanical assembly (10) comprising two tubular parts (11, 12) mutually connected, the tubular part (11), called bearer part, forming a housing (13) by means of which the tubular part (12) called borne part, is assembled thereto. The invention is characterised in that the housing (13) formed by the bearer part (11) is cut out in a swaged part (16) of said bearer part (12) wherein two wall zones ($15_1$, $15_2$) opposite thereof are at least locally in contact with each other along a mutual butt-jointing zone (17) extending from one to the other of the two planes ($P_1$, $P_2$), which, parallel to each other, are offset relatively to each other along swaging direction (D) of these two wall zones ($15_1$, $15_2$). The invention is in particular applicable to motor vehicle suspension arms.

22 Claims, 3 Drawing Sheets

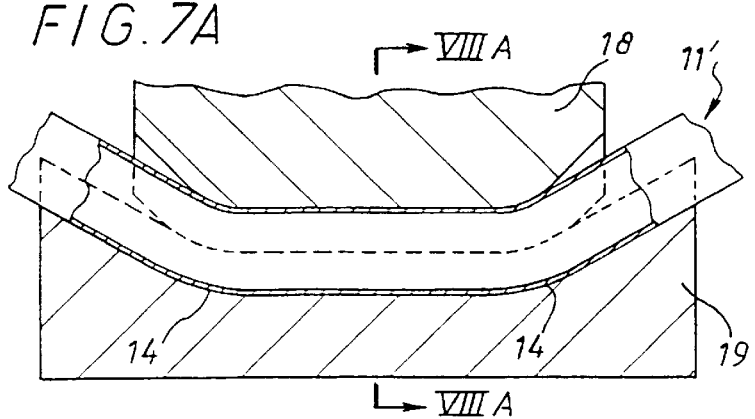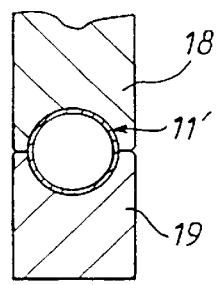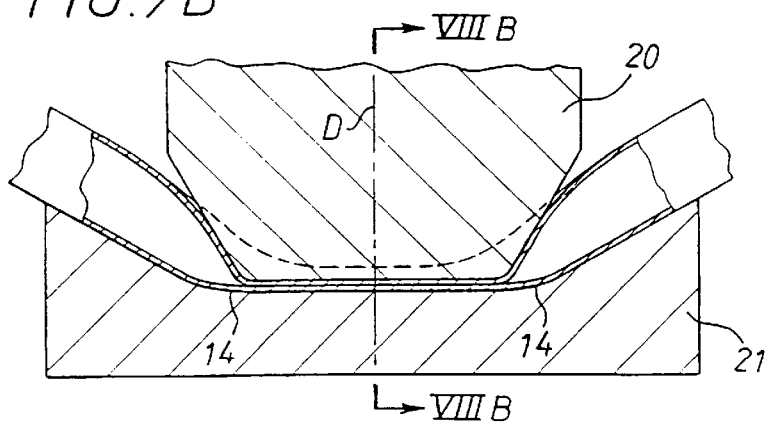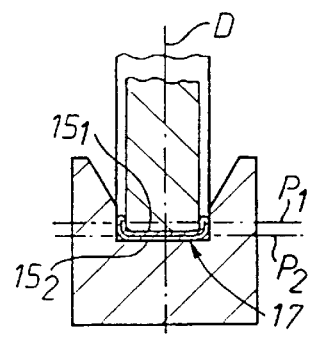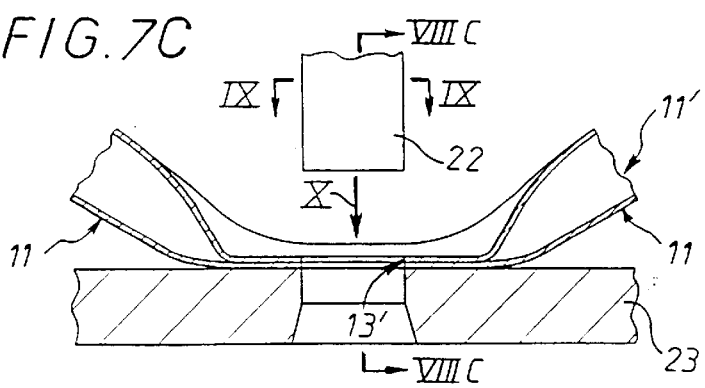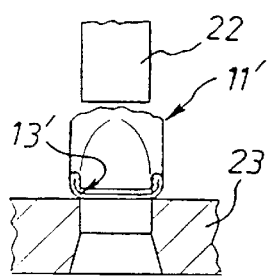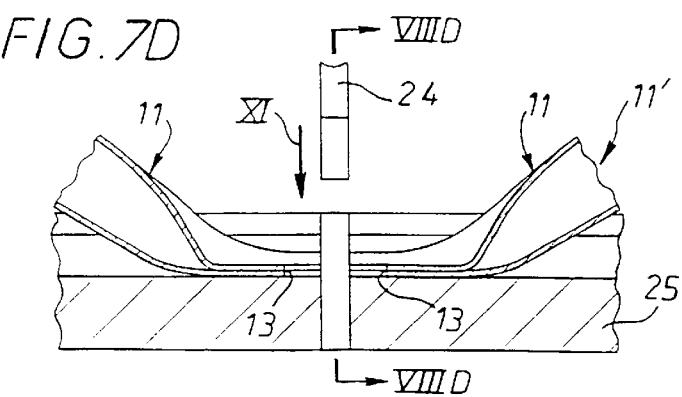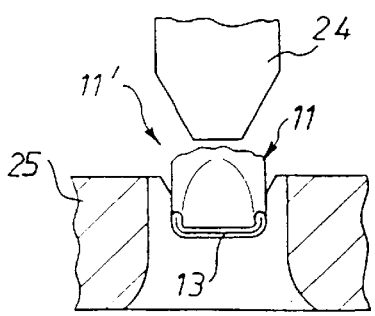

METHOD FOR MUTUALLY CONNECTING TWO TUBULAR PARTS

TECHNICAL FIELD

The present invention is generally concerned with mechanical assemblies comprising two tubular parts joined together, one tubular part, referred to herein for convenience as the carrying part, forming a housing by means of which the other tubular part, referred to herein for convenience as the carried part, is assembled to it.

Here the expression "tubular parts" means, in the usual manner, hollow rectilinear or non-rectilinear and more or less elongate parts which have a closed profile of any shape and thickness in cross section, the carrying part usually having one dimension, referred to as its length, which is significantly greater than all the others.

BACKGROUND ART

Such mechanical assemblies formed in this way of a carrying part and a carried part constitute components or subassemblies used in the construction of suspension units for automobile vehicles, for example, being operative in this case between the wheels of the automobile vehicle and its bodyshell, for example.

For obvious reasons, impacts and vibrations caused by the road and which would otherwise be transmitted to the bodyshell of an automobile vehicle must be filtered out and elastic blocks, commonly referred to as elastic joints, are usually employed for this purpose, their axis being in practise joined to the bodyshell of the automobile vehicle. To be operative between the bodyshell and the wheels, they are each individually housed in bushes attached to the suspension arms carrying the wheels.

Here a bush of the above kind constitutes one of the parts, for example the carried part, of the mechanical assemblies with which this patent application is concerned.

The other part, here the carrying part, is then a tubular arm body, commonly referred to as a suspension arm.

The problem is to provide a satisfactory joint between the carried part and the carrying part.

For reasons of overall size, in the case of automobile vehicle suspension arms, the portion of the carrying part comprising the housing receiving the carried part must, in addition to having transverse dimensions matching those of the carried part, also, by virtue of limited crushing, be subject to some degree of crimping, followed by some degree of flattening, which causes two opposite wall areas of the carrying part to move toward each other.

The housing to receive the carried part must therefore be formed in a partly crushed portion of the carrying part, the carried part being assembled to the carrying part afterwards by welding or crimping, for example.

Although satisfactory, this approach has its drawbacks.

First of all, the required crimping is a costly operation in itself and it is desirable to be able to dispense with it.

Also, and more importantly, the housing to receive the carried part can usually be formed only by machining, which is detrimental to cost because it requires heavy investment and a skilled operative.

To avoid the above drawbacks, a method for jointing two tubular parts has already been proposed (for example in document GB-A-2 291 382) in which one of the tubular parts, referred to here as the carrying part, is locally crushed to move two opposite wall areas thereof toward each other, the crushing of the carrying part is continued until the two wall areas thereof concerned are at least locally in contact with each other in a mutual facing area, a closed contour hole is cut in the crushed portion of the carrying part, forming a housing to receive the other tubular part, referred to here as the carried part, and the carried part is assembled to the carrying part by means of this housing.

The invention concerns a method of the above kind in which the portion of the carrying part in which a housing for the carried part must be formed is intentionally completely crushed.

The required housing can then advantageously be formed merely by cutting, and therefore in a particularly simple and economic manner, for example also on a press.

However, in a method of the above kind as applied in the document previously cited, despite being totally crushed, the carrying part has a cross section with too low a second moment of area, as a result of which the resistance to torsion and/or flexing of the carrying part is not satisfactory.

A general object of the present invention is an arrangement which avoids the above drawbacks and has other advantages.

DISCLOSURE OF INVENTION

According to the invention, a method of the above kind is characterized in that, the carried part being at the end of the carrying part, the mutual facing area of the two wall areas concerned of the carrying part extend from one to the other of two parallel planes which are offset relative to each other in the direction of crushing of the two wall areas.

In other words, instead of being completely flattened, and therefore being exclusively flat, the volume of the crushed portion of the carrying part preferably extends at least in part in the crushing direction and therefore, in practice, along the axis of the carried part, to which end it has one or other of many feasible configurations.

For example, the crushed portion of the carrying part can have a U-shape or T-shape or any other non-planar shape cross section.

The resulting non-planar crushing of the carrying part advantageously enables its section to be reduced in size to match the dimensions of the carried part, thereby avoiding any preliminary crimping.

The invention has the further advantage of enabling two carrying parts to be made at the same time, reducing overall costs.

To this end, it is sufficient to operate symmetrically on one tubular blank and thereafter to separate the two carrying parts thus formed.

The invention also consists in any mechanical assembly, for example any automobile vehicle suspension arm, including two tubular parts joined together by the above method.

BRIEF DESCRIPTION OF DRAWINGS

The objects, features and advantages of the invention will become more apparent from the following description given by way of example and with reference to the accompanying diagrammatic drawings, in which.

MODE(S) FOR CARRYING OUT THE INVENTION

Figure 1:
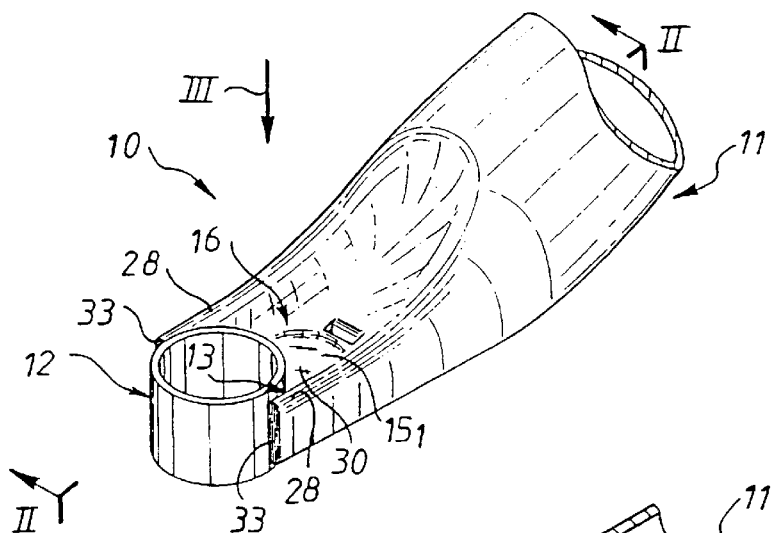
FIG. 1 is a partial perspective view of a mechanical assembly in accordance with the invention.

The figures show that the overall object is to produce a mechanical assembly 10 including two tubular parts 11, 12 joined together, one of the tubular parts 11, 12, referred to here as the carrying part, and in this instance the tubular part 11, forming a housing 13 by means of which the other tubular part 11, 12, referred to here as the carried part, in this instance the tubular part 12, is assembled to it.

The carrying part 11 is not shown in its entirety in the figures.

It is a relatively long tubular part whose length, which has no effect on the invention, is indeterminate.

In the embodiments shown, the carried part 12 is at the end of the carrying part 11 and is a simple bush of limited height.

Figure 2:
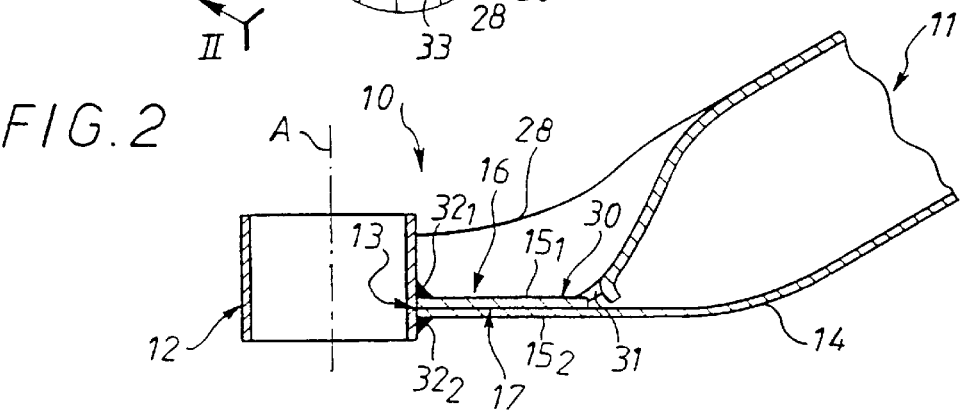
FIG. 2 is a partial view of the assembly in longitudinal section taken along the line II—II in FIG. 1.
Figure 3:
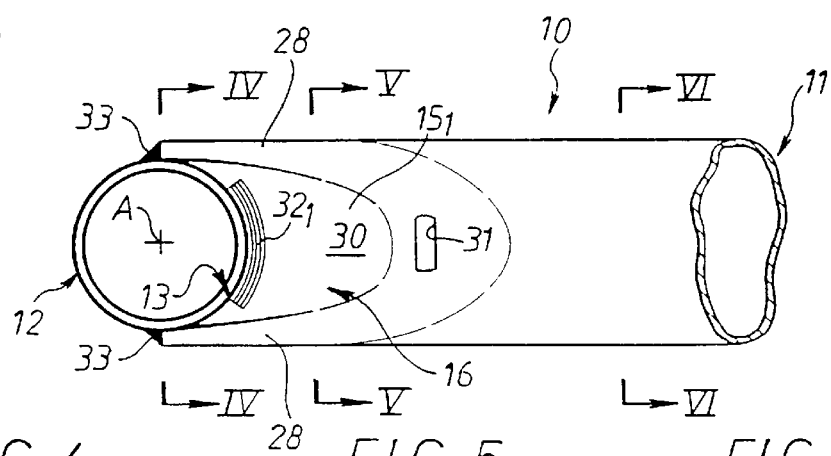
FIG. 3 is a partial plan view of the assembly as seen in the direction of the arrow III in FIG. 1, FIGS. 4, 5 and 6 are views of the assembly in cross section taken along the lines IV—IV, V—V and VI—VI, respectively, in FIG. 3, FIGS. 7A, 7B, 7C, 7D are partial views in longitudinal section showing various successive steps of the method of the invention when it is used to make two carrying parts at the same time for two mechanical assemblies of the type shown in FIG. 1, FIGS. 8A, 8B, 8C and 8D are partial views in cross section taken along the respective lines VIIIA—VIIIA, VIIIB—VIIIB, VIIIC—VIIIC and VIIID—VIIID in FIGS. 7A, 7B, 7C and 7D.
Figure 4:
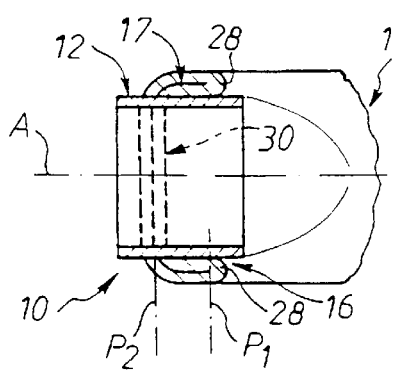

The carried part 12 has an axis A shown diagrammatically in chain-dotted line in FIGS. 2 and 4. Its position is shown in FIG. 3.

In the embodiments shown, it is assumed for the sake of simplicity that the entire length of the carrying part 11 lies in a plane passing through the axis A of the carried part 12, with a slight bend 14 in this plane at a distance from the carried part 12.

This is not mandatory, however, and the carried part 12 can on the contrary diverge from any such plane at a distance from the carrying part 11 or, more generally, have any configuration.

Figure 6:
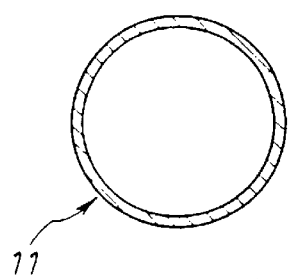

In the embodiments shown, it is also assumed for the sake of simplicity that the main part of the carrying part 11 has a circular profile in cross section (see FIG. 6) and that the carried part 12 also has a circular profile in cross section.

This is not mandatory, however, and either of these profiles could be of any shape.

In a manner that. is known in itself, one of the tubular parts 11, 12, in this instance the carrying part 11, is locally crushed with a view to jointing the two tubular parts 11, 12, which moves two opposite wall areas 151, 152 of that part toward each other, the wall area $15_1$, becoming its top wall, for example and the wall area 152 its bottom wall, and the housing 13 adapted to receive the other tubular parts 11, 12, in this instance the carried part 12, is formed in the crushed portion 16 of the carrying part 11. As described in more detail later, the carried part 12 is assembled to the carrying part 11 at least by means of the housing 13.

As in the embodiments shown, the housing 13 formed in the carrying part 11 is preferably adapted to receive the carried part 12 transversely, i.e. substantially perpendicularly to the original lengthwise direction of the carrying part 11.

Here the carrying part 11 is crushed until the two wall areas $15_1$, $15_2$ concerned are at least locally in contact with each other in a mutual facing area 17 and the housing 13 to receive the carried part 12 is formed by cutting, for example by punching in a press, in the mutual facing area 17.

The carrying part 11 is preferably crushed in a crushing direction D (see FIGS. 7B and 8B) chosen to correspond to the axis A of the carried part 12.

Although this is not mandatory, a common tubular part blank 11' can be worked symmetrically so as to form therein two facing identical carrying parts 11, after which the carrying parts 11 are separated.

The tubular blank 11' can be shaped appropriately during an optional first operation when, as shown here, the required carrying parts 11 incorporate a bend 14 (see FIGS. 7A and 8A).

This first operation therefore merely entails bending the tubular blank 11' at two opposite points.

Top and bottom forming members 18 and 19 of appropriate shape are used to perform this operation on a hydraulic press, for example.

The tubular blank 11' is crushed between the two bends 14 by a second pressing operation (see FIGS. 7B and 8B).

A punch 20 and a die 21 are used to perform this operation on a hydraulic press, for example.

During a third operation (see FIGS. 7C and 8C), a housing 13' corresponding to the two housings 13 required is cut in the tubular part 11', to be more precise in the middle of its crushed portion 16.

A cutter punch 22 and a die 23 are used to perform this operation on a hydraulic press, for example.

Figure 9:
FIG. 9 is a view of the punch shown in elevation in FIG. 7C in cross section taken along the line IX—IX in FIG. 7C.
Figure 10:
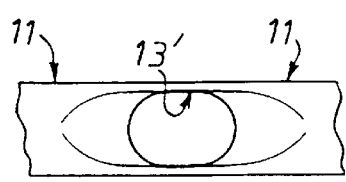
FIG. 10 is a partial plan view of the tubular part concerned as seen in the direction of the arrow X in FIG. 7C.

As seen better in FIG. 9, the cutter punch 22 has an oblong profile in cross section.

The two carrying parts 11 are separated by parting the tubular blank 11' during a fourth operation (see FIGS. 7D and 8D).

A cutter blade 24 and a die 25 are used to perform this operation on a hydraulic press, for example.

Figure 11:
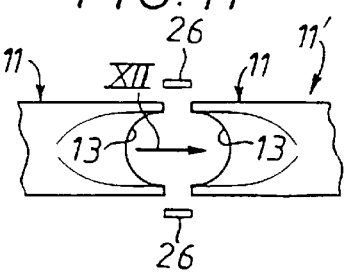
FIG. 11 is a similar plan view showing the separation of that tubular part into two carrying parts, as seen in the direction of the arrow XI in FIG. 7D.

The cutter blade 24 makes a cut transversely through the middle of the housing 13', forming two tongues 26 on respective opposite sides of the housing 13' in the tubular part 11' (see FIG. 11).

All the above operations can of course be performed on the same hydraulic press using a sequence of tools.

Be this as it may, as a result of the foregoing procedure the housing 13 formed in a carrying part 11 to receive a carried part 12 is cut out from a crushed portion 16 of the carrying part 11 in which two opposite wall areas $15_1$, $15_2$ are at least locally in contact with each other in a mutual facing area 17.

In the embodiments shown, the housing 13 formed in the carrying part 11 extends in a semicircle with a diameter that corresponds to the outside diameter of the carried part 12.

As in all the embodiments shown, the mutual facing area 17 of the two wall areas $15_1$, $15_2$ concerned of the carrying part 11 preferably extends from one to the other of two parallel planes $P_1$, $P_2$ which are offset from each other in the direction D of crushing the two wall areas $15_1$, $15_2$ (see FIG. 8B) and therefore in the direction of the axis A of the carried part 12 (see FIGS. 4 and 12 to 20).

In other words, the mutual facing area 17 of the two wall areas $15_1$, $15_2$ of the crushed portion 16 of the carrying part 11 has, at least locally, points common with two parallel planes $P_1$, $P_2$ which are offset from each other.

In the embodiment shown in FIGS. 1 to 6, the crushed portion 16 of the carrying part 11 forms two substantially parallel lateral rims 28 running along the mutual facing area 17 of its two opposite wall areas $15_1$, $15_2$ and on respective opposite sides of a middle portion 30, projecting from the same side of the middle portion 30 on respective opposite sides of the axis A of the carried part 12.

Furthermore, in this embodiment, the middle portion 30 of the crushed portion 16 of the carrying part 11 is plane and substantially perpendicular to the axis A of the carried part 12.

The carried part 12 lies between the rims 28 on the carrying part 11.

To be more precise, in the embodiments shown, the rims 28 on the carrying part 11 are substantially tangential to the carried part 12, to which they are joined at their end.

Figure 5:
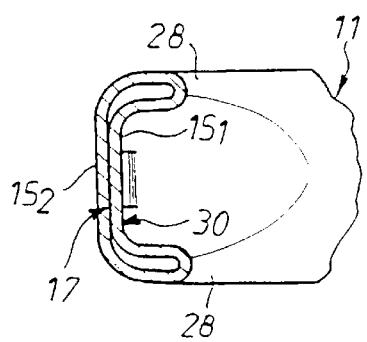

In this embodiment, and as shown in FIG. 5, the walls areas $15_1$, $15_2$ of the carrying part 11 progressively diverge along its rims 28 in the direction away from the carried part 12 but remain in contact with each other along its middle part 30.

In the embodiment shown, the wall area 15. of the carrying part 11 has a punched opening 31 flanking the middle portion 30 of the crushed portion 16 of the carrying part 11, adapted to serve as a vent when the mechanical assembly 10 concerned is quenched.

In this embodiment the carried part 12 is welded to the carrying part 11, for example.

As shown here, a circular arc-shaped weld $32_1$, is formed between the wall area $15_1$ of the carrying part 11 and the carried part 12, another circular arc-shaped weld $32_2$ is formed between the wall area $15_2$ of the carrying part 11 and the carried part 12, and a weld 33 is formed at the end of each of the rims 28 of the carrying part 11, between the rim 28 and the carried part 12, along a generatrix of the carried part.

In other words, the carried part 12 is attached to the carrying part 11 not only by means of the housing 13 through which the carried part 12 is engaged with the carrying part 11 but also by means of the rims 28 of the carrying part.

In this way the carrying part 11 and the carried part 12 form a very strong joint, which is relatively economic to manufacture, the carrying part 11 being very stiff in torsion about its lengthwise direction and in flexing in its median plane, i.e. in the plane passing through its mid-line and perpendicular to its crushed portion 16, symbolized by the plane $P_2$, as well as in the plane $P_2$.

FIGS. 12 through 20 show the edge of the mutual facing area 17, which is perpendicular to the plane of FIGS. 12 to 20, and because it is formed of one or more surfaces, it is represented in these figures by single lines defining its profile.

Figure 12:
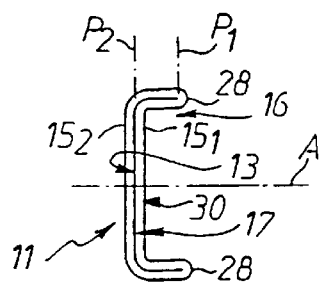
FIG. 12 is an end view of a carrying part of the mechanical assembly of the invention, as seen in the direction of the arrow XII in FIG. 11, and FIGS. 13, 14, 15, 16, 17, 18, 19 and 20 are end views analogous to that of FIG. 12 and each relating to a respective embodiment.

In the embodiment shown in FIG. 12, which corresponds to that shown in FIGS. 1 to 6, this profile is generally U-shaped with a flat bottom (or a C-shaped bottom, depending on the direction from which it is observed).

Figure 13:
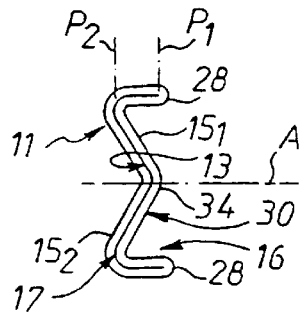

This is substantially the same in the embodiment shown in FIG. 13 but, in this embodiment, the middle portion 30 of the crushed portion 16 of the carrying part 11 includes at least one localized deformation 34.

As shown here, for example, the deformation 34 affects both wall areas $15_1$, $15_2$ of the carrying part 11 and is in the form of a dihedron whose concave side faces in the opposite direction to the rims 28.

In practice, the apex of the dihedron in question lies along the center-line of the middle portion 30 and its two panels extend continuously and symmetrically from that apex to the base of the rims 28.

Figure 14:
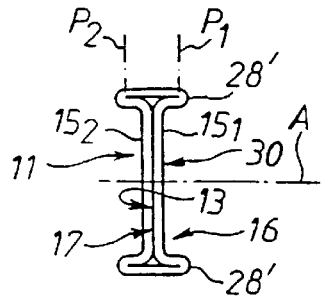

In the embodiment shown in FIG. 14, the crushed portion 16 of the carrying part 11 forms two lateral rims 28' along the mutual facing area 17 of its two opposite wall areas $15_1$, $15_2$, on respective opposite sides of its middle portion 30, projecting from both sides of the middle portion 30 on respective opposite sides of the axis A of the carried part 12, as previously.

Also as previously, the carried part 12 lies between the rims 28' of the carrying part 11, which are substantially tangential to the carried part 12, to which they are fastened at their end.

In the embodiment shown in FIG. 14, the profile of the mutual facing area 17 of the two opposite wall areas $15_1$, $15_2$ of the carrying part 11 is generally H-shaped (or I-shaped, depending on the direction of observation).

Figure 15:
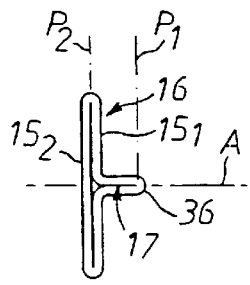
Figure 16:
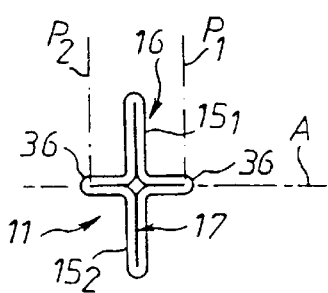
Figure 17:
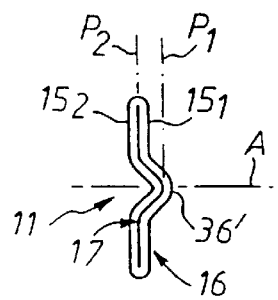

In the embodiments shown in FIGS. 15 to 17, the crushed portion 16 of the carrying part 11 forms axially, i.e. in its central area, along the mutual facing area 17 of its two opposite wall areas $15_1$, $15_2$, at least one rib 36, 36' which is substantially plane and perpendicular to the axis A of the carried part 12.

There is only one such rib 36, for example (see FIG. 15), and it is formed by localized deformation of one of the wall areas $15_1$, $15_2$ of the carrying part 11, in this instance the top wall area $15_1$ thereof.

As an alternative to this (FIG. 16) there are two ribs 36 back-to-back, one in each wall area $15_1$, $15_2$ of the carrying part 11.

In the embodiment shown in FIG. 17 the single rib 36' is formed only in the central area of the carrying part 11 by conjoint deformation of both wall areas $15_1$, $15_2$ of the carrying part 11 and is in the form of a dihedron.

The rib(s) 36, 36' are substantially radial relative to the carried part 12, to which they are butt-jointed at their end, in a manner similar to that previously referred to.

Figure 18:
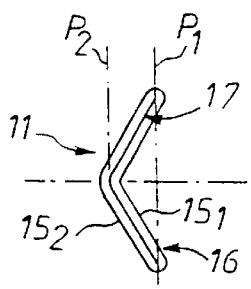
Figure 19:
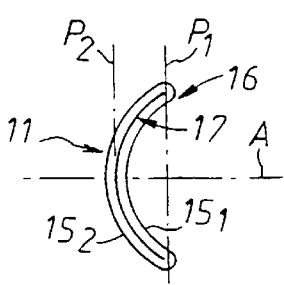
Figure 20:
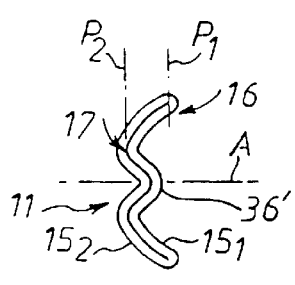

In the embodiments shown in FIGS. 18 to 20, the crushed portion 16 of the carrying part 11 is generally bent or curved in the mutual facing area 17 of its two opposite wall areas $15_1$, $15_2$ into the general shape of an elongate gutter substantially perpendicular to the axis A of the carried part 12. As shown here, for example, its concave side faces toward the top wall area $15_1$.

The crushed portion 16 is globally bent into a dihedron, for example (see FIG. 18).

As an alternative (see FIGS. 19 and 20) it has a generally circular arc-shaped curved profile.

In the embodiment shown in FIG. 20, the crushed portion 16 of the carrying part 11 is formed with at least one rib 36' in its central area which, as shown here, and as previously, takes the form of a dihedron, for example, whose concave side faces toward its bottom wall area $15_2$.

Note that in all cases the mutual facing area 17 of the two opposite wall areas $15_1$, $15_2$ of the carrying part 11 has a non-planar configuration and, as previously, the carried part 12 is attached to the carrying part 11 not only by means of the housing 13 in the carrying part 11 but also by means of its rims 28, 28' or ribs 36, 36'.

In the embodiments shown, the mechanical assembly 10 of the invention forms the whole or part of an automobile vehicle suspension arm, for example.

In other words, the present invention encompasses any automobile vehicle suspension arm incorporating a mechanical assembly 10 of the above kind.

However, the present invention is not limited to the embodiments shown, of course, and to the contrary encompasses any variant execution thereof.

In particular, the features of the various embodiments shown can be combined in whole or in part.

Also, the cut-out required in the carrying part to form the required housing is not necessarily formed by punching, or by punching on a press.

It can be formed by other cutting means, for example a laser.

Finally, the field of application of the invention is not limited to that of automobile vehicle suspension arms, but extends more generally to all mechanical assemblies including two joined tubular parts.

What is claimed is:

1. Method of jointing two tubular parts (11, 12), of the kind in which at least one of the tubular parts, referred to herein as the carrying part (11), is locally crushed to move two opposite wall areas ($15_1$, $15_2$) thereof toward each other, the carrying part (11) is crushed until the two wall areas ($15_1$, $15_2$) thereof concerned are at least locally in contact with each other in a mutual facing area (17), a housing (13) adapted to receive the other tubular part, referred to herein as the carried part (12), is formed by cutting in the crushed portion of the carrying part (11), and the carried part (12) is assembled to the carrying part (11) by means of the housing (13), characterized in that, the carried part (12) being at the end of the carrying part (11), the mutual facing area (17) of the two wall areas ($15_1$, $15_2$) concerned of the carrying part (11) extends from one to the other of two parallel planes ($P_1$, $P_2$) which are offset relative to each other in the direction (D) of crushing of the two wall areas ($15_1$, $15_2$).

2. Method according to claim 1, characterized in that a common tubular blank (11') is worked symmetrically to form therein two facing identical carrying parts (11) and those two carrying parts (11) are thereafter separated from each other.

3. Mechanical assembly including two tubular parts (11, 12) joined together, one of the tubular parts (11, 12), referred to herein as the carrying part (11) forming a housing (13) by means of which the other tubular part (11, 12), referred to herein as the carried part (12), is assembled to it, characterized in that, in application of a method according to claim 1, the housing (13) that the carrying part (11) forms is cut into a crushed portion (16) of the carrying part (11) in which two opposite wall areas ($15_1$, $15_2$) thereof are at least locally in contact with each other in a mutual facing area (17) which extends from one to the other of two parallel planes ($P_1$, $P_2$) which are offset relative to each other along the axis (A) of the carried part (12), the carried part (12) being at the end of the carrying part (11).

4. Mechanical assembly according to claim 3, characterized in that, in the mutual facing area (17) of its two opposite wall areas ($15_1$, $15_2$), the crushed portion (16) of the carrying part (11) forms two lateral rims (28) on respective opposite sides of a middle portion (30), projecting from the same side of the middle portion (30), substantially parallel to each other, and each on respective opposite sides of the axis (A) of the carried part (12).

5. Mechanical assembly according to claim 4, characterized in that the middle portion (30) of the crushed portion (16) of the carrying part (11) is plane and transverse to the axis (A) of the carried part (12).

6. Mechanical assembly according to claim 5, characterized in that the middle portion (30) is substantially perpendicular to the axis (A) of the carried part (12).

7. Mechanical assembly according to claim 6, characterized in that the housing (13) formed on the carrying part (11) is semi-circular with a diameter that corresponds to the outside diameter of the carried part (12).

8. Mechanical assembly according to claim 4, characterized in that the middle portion (30) of the crushed portion (16) of the carrying part (11) includes at least one localized deformation (34).

9. Mechanical assembly according to claim 8, characterized in that the deformation (34) of the middle portion (30) of the crushed portion (16) of the carrying part (11) is in the form of a dihedron.

10. Mechanical assembly according to claim 4, characterized in that the carried part (12) is between the rims (28, 28') of the carrying part (11).

11. Mechanical assembly according to claim 10, characterized in that the rims (28, 28') of the carrying part (11) are substantially tangential to the carried part (12).

12. Mechanical assembly according to claim 3, characterized in that, in the mutual facing area (17) of its two opposite wall areas ($15_1$, $15_2$), the crushed portion (16) of the carrying part (11) forms two lateral rims (28') on respective opposite sides of a middle portion (30) and projecting from two sides of the middle portion (30) on respective opposite sides of the axis (A) of the carried part (12).

13. Mechanical assembly according to claim 3, characterized in that the crushed portion (16) of the carrying part (11) forms at least one rib (36, 36') in its central area along the mutual facing area (17) of its two opposite wall portions ($15_1$, $15_2$).

14. Mechanical assembly according to claim 13, characterized in that the rib (36) is formed by localized deformation of one of the wall areas ($15_1$, $15_2$) of the carrying part (11).

15. Mechanical assembly according to claim 14, characterized in that there are two back-to-back ribs (36), one on each wall area ($15_1$, $15_2$) of the carrying part (11).

16. Mechanical assembly according to claim 13, characterized in that the rib (36') is formed by conjoint deformation of both wall areas ($15_1$, $15_2$) of the carrying part (11).

17. Mechanical assembly according to claim 3, characterized in that the crushed portion (16) of the carrying part (11) is bent or curved in the mutual facing area (17) of its two opposite wall areas ($15_1$, $15_2$), to the general form of an elongate gutter substantially perpendicular to the axis (A) of the carried part (12).

18. Mechanical assembly according to claim 17, characterized in that the crushed portion (16) of the carrying part (11) is bent to form a dihedron.

19. Mechanical assembly according to claim 17, characterized in that the crushed portion (16) of the carrying part (11) is curved to form a circular arc-shaped part.

20. Mechanical assembly according to claim 17, characterized in that the crushed portion (16) of the carrying part (11) forms at least one rib (36') in its central area.

21. Mechanical assembly according to claim 3, characterized in that the carried part (12) is a bush of limited height.

22. Automobile vehicle suspension arm characterized in that it includes a mechanical assembly (10) according to claim 3.

* * * * *

UNITED STATES PATENT AND TRADEMARK OFFICE
CERTIFICATE OF CORRECTION

PATENT NO. : 6,250,657 B1
DATED : June 26, 2001
INVENTOR(S) : Daniel Valin et al.

It is certified that error appears in the above-identified patent and that said Letters Patent is hereby corrected as shown below:

<u>Title page,</u>
Item [73], Assignee, amend as follows: -- [73] Assignee: Vallourec Composants Automobiles Vitry, Vitry-Le-Francois (FR) --.

Signed and Sealed this

Eighteenth Day of June, 2002

*Attest:*

JAMES E. ROGAN
*Attesting Officer*   *Director of the United States Patent and Trademark Office*